United States Patent [19]

Valbona et al.

[11] Patent Number: 4,645,352

[45] Date of Patent: Feb. 24, 1987

[54] CONVERSION UNIT FOR A PORTABLE HAND-HELD APPLIANCE AND CONVERTIBLE MIXER COMBINATION UTILIZING SAME

[75] Inventors: Bruno M. Valbona, Farmington; Bruno Satkunas, North Canton; Stanley J. Brym, Torrington, all of Conn.

[73] Assignee: Dynamics Corporation of America, Greenwich, Conn.

[21] Appl. No.: 774,951

[22] Filed: Sep. 11, 1985

[51] Int. Cl.$^4$ ............................................. B01F 13/00
[52] U.S. Cl. .................................... 366/349; 366/129; 366/199; 366/192; 366/343
[58] Field of Search ............... 366/349, 348, 343, 344, 366/297, 129, 299, 300, 301, 298, 292, 199, 197, 241; 241/101 B, 101.1, 101.2

[56] References Cited

U.S. PATENT DOCUMENTS

| | | |
|---|---|---|
| 2,012,486 | 8/1935 | Strauss . |
| 2,687,284 | 8/1954 | Gerber et al. . |
| 2,762,613 | 9/1956 | Burton . |
| 2,789,799 | 4/1957 | Kaufman ............................ 366/129 |
| 3,821,902 | 7/1974 | Bois ..................................... 366/349 |
| 4,339,639 | 7/1982 | Valbona et al. . |

Primary Examiner—Robert W. Jenkins
Attorney, Agent, or Firm—Sixbey, Friedman & Leedom

[57] ABSTRACT

A conversion unit is provided which permits the conversion of a portable hand-held appliance, such as a mixer having a pair of beaters, to a stationary drink mixer having a single depending stirring shaft. The conversion unit includes a power unit receptacle that securely supports the portable appliance power unit in a manner which permits the driving engagement of the stirring shaft by a power take-off of the portable appliance power unit. Stabilizing fingers in the power unit receptacle additionally engage the power unit to provide enhanced stability. Storage for the pair of mixer beaters may be provided at the rear of the unit when the portable appliance is an electric mixer so that all components of the convertible mixer combination are maintained within a single integrated unit.

12 Claims, 6 Drawing Figures

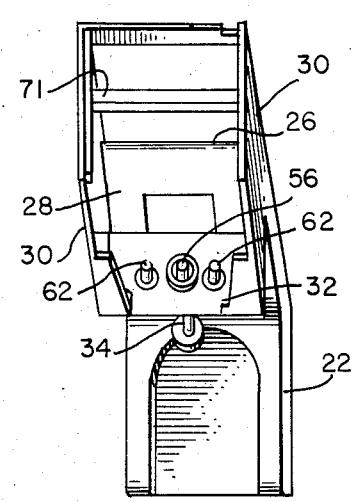
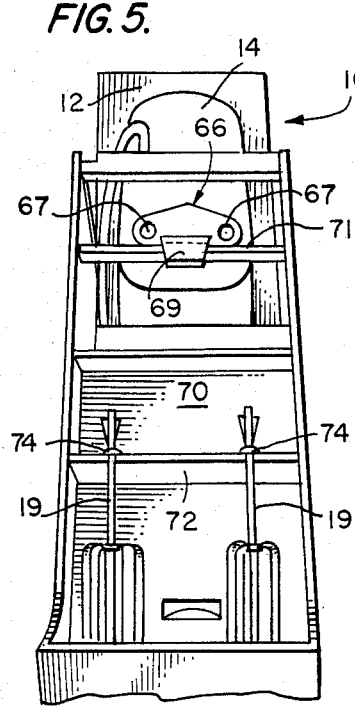
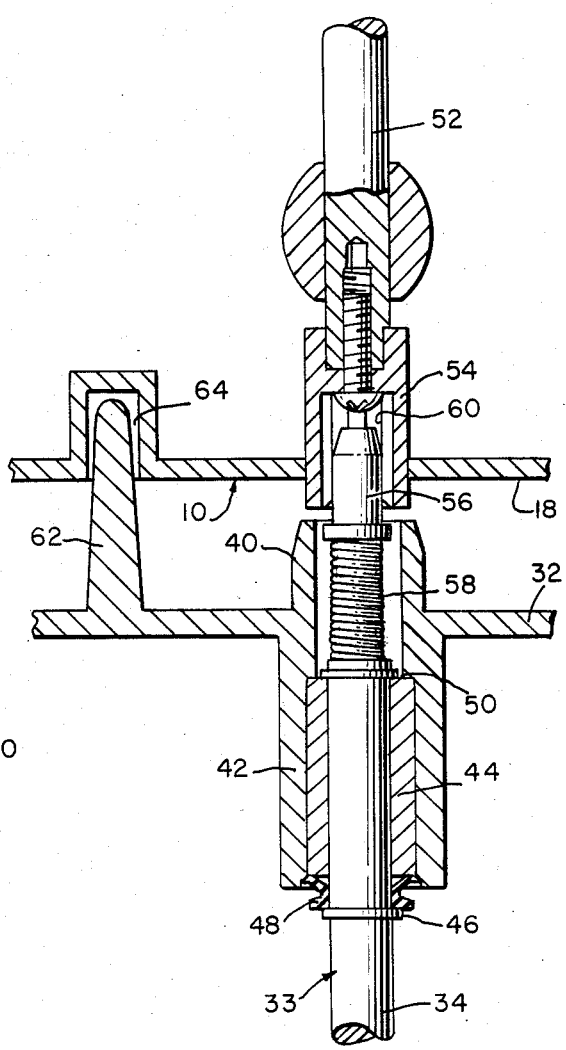

CONVERSION UNIT FOR A PORTABLE HAND-HELD APPLIANCE AND CONVERTIBLE MIXER COMBINATION UTILIZING SAME

TECHNICAL FIELD

The present invention relates generally to a domestic mixing appliance and particularly to a mixing appliance which may be readily converted from a first type of portable hand-held appliance to a second type of stationary stand mixer and reconverted from the second mixer to the first appliance.

BACKGROUND ART

Small, multi-function kitchen appliances have long been available to the home food preparer and cook. A typical appliance may include one or more attachments which can be added to a single basic stand unit to permit the performance of several food preparation functions. One example of such an appliance, disclosed by Strauss in U.S. Pat. No. 2,012,486, is a stationary stand mixer of the type having a pair of downwardly directed beaters which can be either converted to a portable hand mixer or utilized in its stationary condition to drive a juice extractor or other attachment. This appliance includes a power unit which may be drivingly coupled to a pair of beater sockets or to a supplemental power take-off for driving a juicer or other attachment which must be mounted on the top of the power unit.

Burton discloses a multi-function rotary appliance in U.S. Pat. No. 2,762,613 which provides a stand to support a power unit which may be employed to drive a pair of mixer beaters and to operate a variety of rotary attachments, including a blender, liquifier, ice cream freezer, coffee mill, can opener, knife grinder, meat commutator or the like. However, appliances such as those described by Burton are bulky and cumbersome and do not present a streamlined, aesthetically pleasing appearance and require considerable storage space for the stand and attachments. In addition, these devices tend to be significantly less stable than the single purpose equivalent appliance.

It is also known, as taught by Gerber et al. in U.S. Pat. No. 2,687,284, to create a convertible mixer combination, including a portable hand-held mixer, utilizing a conversion unit into which is built a take-off coupling drive arrangement designed for plug-in coupling at one end with a supplemental power take-off socket on the power unit of the portable mixer portion. The opposite end of this take-off coupling drive arrangement is drivingly coupled to an auxiliary rotary appliance attachment, such as a juicer or blender, mounted on the conversion unit. While such an arrangement may enable the conversion of a portable hand-held mixer into another form of rotary appliance that is more stable than convertible mixer combinations such as those taught by Strauss or Burton, the Gerber et al. converted mixer combination still is somewhat patchwork in appearance and is only suitable for converting the mixer into appliances which utilize a bottom-mounted agitator, such as a juicer or blender.

Mixers of the type with an electric drive motor which projects over a base from the top of a standard and which supports and drives a depending stirrer shaft for mixing beverages in an elongated cylindrical container are extremely well known mixing appliances. U.S. Pat. No. 4,339,639 to Valbona et al. describes such a mixer. However, despite the conventionality of the Valbona et al. type of drink mixer and the known practice of converting portable hand-held mixers into other rotary appliances, it has, heretofore, been unknown to convert a portable hand-held mixer into a drink mixer of the depending stirrer shaft type, and no conversion unit for accomplishing this result has been proposed by the prior art.

SUMMARY OF THE INVENTION

Accordingly, it is a primary object of the present invention to provide a conversion unit and convertible mixer combination that enables a portable hand-held mixer to be converted into a drink mixer of the depending stirrer shaft type.

In accordance with another object of the present invention, it is desired to achieve a conversion unit and convertible mixer combination which, in its drink mixer configuration, possesses the stability and essentially the same appearance as a drink mixer built exclusively for that purpose.

It is yet another object of the present invention to create a conversion unit and convertible mixer combination that enables easy conversion of the hand-held portable mixer power unit into the drink mixer configuration, while achieving a slip-free torque transmission linkage between the take-off coupling of the conversion unit and the supplemental power take-off of the mixer power unit.

A still further object of the present invention is to provide a drink mixer conversion unit which enables a portable motor driven unit to either drive the drink mixer or to be removed and employed for other uses.

The aforesaid objects are achieved by providing a conversion unit for employing a portable electric motor, which may be the drive motor for a portable appliance, such as a hand-held mixer as the removable power unit for a drink mixer. In a preferred embodiment, the conversion unit includes a base with an upright standard having a power unit receptacle located at the upper end of the standard and a receiving space for detachably holding the power unit. A stirrer having a vertical shaft is rotatably journaled to a bottom wall of the power unit receptacle. The upper end of the stirrer shaft is connected to a take-off coupling plug which projects upwardly into the receiving space so that it will matingly engage a supplemental power take-off on the power unit when the power unit is received within the receiving space. To achieve a slip-free torque transmission between the power take-off and the take-off coupling plug, coupling adjustment means are provided for positionally adjusting the take-off coupling plug into firm engagement with the supplemental power take-off when the take-off coupling plug is driven by the power unit. In a preferred form, the coupling adjustment means is a coil spring which is wound in a direction opposite to the direction in which the stirrer shaft is driven by the supplemental power take-off so that the torque applied by the supplemental power take-off causes an unwinding expansion of the spring, displacing the take-off coupling plug upwardly into secure engagement with the power take-off socket.

The power unit receptacle is open at the top and in the front but is at least partially enclosed by wall members at the rear and on opposite lateral sides, which allows the power unit to be inserted easily into the receptacle in a vertical orientation. This vertical orientation ensures mating engagement between the power take-off socket and the take-off coupling plug and, at the same time, creates a stable assemblage. To increase further the streamlined appearance of the appliance, the standard is constructed with a rear storage area which is concealed from view by the front and side walls of the standard to provide convenient, readily accessible storage for a pair of beaters employed by a hand-held portable mixer which may be used to power the drink mixer.

Other objects and advantages of the present invention will be apparent from the following detailed description, claims and drawings.

BRIEF DESCRIPTION OF THE DRAWINGS

FIG. 3 is a top elevational view of the conversion unit of FIG. 2;

FIG. 4 is a partial sectional view illustrating the connection between the stirrer of the conversion unit and the supplemental power take-off of the power unit of the hand-held mixer in accordance with a preferred embodiment of the present invention;

FIG. 5 is a rear elevational view of the conversion unit with the mixer beaters stored in place.

BEST MODE FOR CARRYING OUT THE INVENTION

The multi-purpose household appliance of the present invention is quickly and easily converted from one kind of appliance to another, totally different, type of mixing appliance without sacrificing either efficiency or aesthetics. For example, the home cook can readily employ the present appliance to perform the functions of both a portable hand-held mixer and a stationary drink mixer. In addition, all of the components of these mixers are supported by or contained within a single streamlined unit which occupies minimal kitchen counter space.

Figure 1:
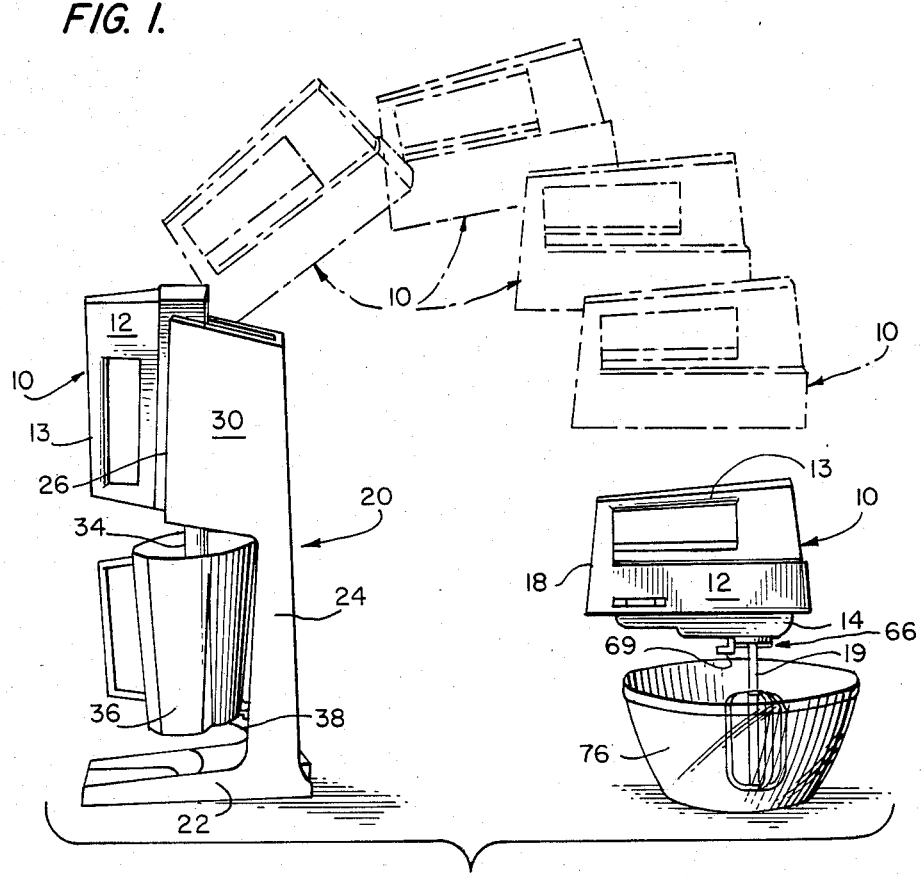
FIG. 1 is a diagrammatic side view illustrating the conversion of a portable hand-held mixer to a stationary drink mixer in accordance with the present invention.

Referring to the drawings, the convertible mixer combination of the present invention has two major components. FIG. 1 diagrammatically illustrates these major components and their conversion from a portable hand-held mixer to a stationary drink mixer. Obviously, the electric motor for other hand held appliances, such as an electric knife, might be used in place of the hand held mixer. Fur purposes of illustration however, the first major component of the combination will be a portable hand-held mixer unit 10 with a housing 12 enclosing a conventional motor (not shown) that is drivingly coupled to a pair of beater sockets (not shown) and to a power take-off socket to be described in detail below. The housing 12 of the hand held mixer 10 is of a generally elongated rectangular configuration and includes a handle 13 which may include a motor activating switch, identifying indicia or the like. The beater sockets are positioned on the underside 14 toward the forward end of the housing and a power take-off socket is located in the housing rear end wall 18. A pair of conventional mixer beaters 19 are engaged by the beater sockets.

Figure 2:
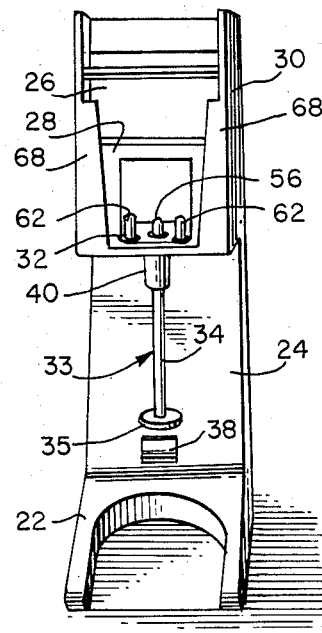
FIG. 2 is a front perspective view of the conversion unit of the preferred embodiment of the present invention.
Figure 6:
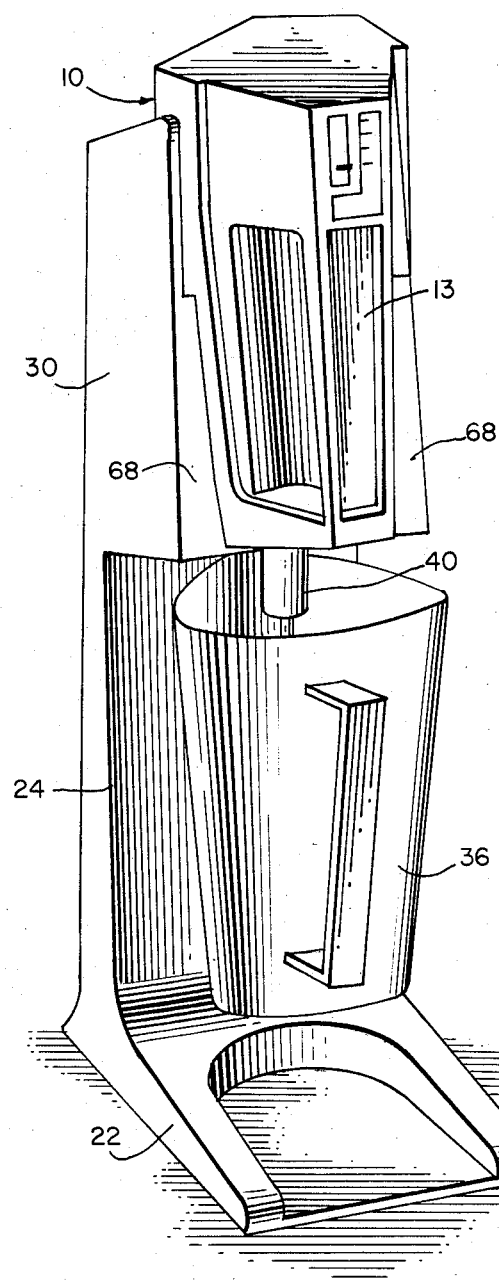
FIG. 6 is a front elevational view of the present invention in its drink mixer form.

The second major component of the present invention is the conversion unit 20 which includes a base 22 to which an upright standard 24 is connected. Located at an upper end of the standard 24 is a power unit receptacle 26 which, as can be seen clearly from FIGS. 2 and 3, is open at the top and front and is at least partially closed by wall members 28 and 30 in the rear and laterally on opposite sides, respectively, as well as by a bottom wall 32. The power unit receptacle 26 receives and supports the hand-held mixer unit 10 in a manner to be described in detail hereinbelow which allows the mixer power unit to be utilized to drive a mixing element 33 when the mixer unit 10 is mounted on the conversion unit 20 as shown in FIGS. 1 and 6. The mixing element 33 forms an integral part of the conversion unit 20 and is permanently attached to the bottom wall 32 of power unit receptacle 26. This mixing element includes a stirrer shaft 34, which extends downwardly toward the base 22 into a removable drink mixer container 36. Shaft 34 includes at its distal end a circular mixing blade 35. The preferred configuration of the drink mixer container is the three-sided design shown in the drawings. This particular configuration not only maintains the sleek, streamlined profile of the present invention but also has been found to maximize mixing action. However, other container configurations which achieve these functional results are contemplated to be within the scope of the present invention.

A container support 38 is provided on standard 24 to support the mixing container 36 in a position which allows the stirrer vertical shaft 34 to extend an optimum distance into the container to achieve effective mixing. The construction of the conversion unit 20 is further illustrated from two different perspectives in FIGS. 2 and 3.

FIG. 4 illustrates in detail the coupling between the portable mixer power take-off socket and the stirrer shaft 34. The stirrer shaft is rotatably supported by the bottom wall 32 of the power unit receptacle 26 in a tubular housing 40 which extends above and below the bottom wall and is formed integrally therewith. Mounted within the lower portion 42 of the tubular housing is a bearing 44. The stirrer shaft 34 is maintained within the bearing 44 by a lower annular collar 46 formed on the shaft to support a resilient seal member 48. An upper annular colar 50 formed on the stirrer shaft 34 engages the upper end of the bearing so that the seal member 48 is partially compressed between the lower annular collar and the lower edge of the tubular housing.

Power to rotate the stirrer shaft 34 is supplied by a drive shaft 52 from the motor within the housing 12 of the hand-held portable mixer unit 10. The utilization of the same power source for both mixing functions is rendered possible by providing a power take-off socket 54 mounted for rotation in the rear wall 18 of the mixer unit 10. The conversion unit 20 supports the mixer unit in a substantially vertical orientation so that the power take-off socket is directed downwardly to engage a coupling plug 56 attached to the upper end of stirrer shaft 34 by a coil spring 58.

In order to provide a slip-free coupling between the stirrer shaft 34 and the power take-off socket 54 of the hand-held mixer 10, the coil spring 58 has one end connected to the lower end of the coupling plug 56 and a second end connected to the annular collar 50 of stirrer shaft 34 in a manner which holds the coupling plug in a position projecting outwardly from tubular housing 40 into the bottom of the power unit receptacle. In this regard, it is noted that it is important that the direction of winding of coil spring 58 be opposite to the direction of rotation of the power take-off socket 54 and stirrer shaft 34 to insure a proper, slip-free connection therebetween. Therefore, when the coupling plug 56 is driven by the power take-off socket 54, the torque transmitted to the coil spring 58 will cause it to unwind and expand vertically, which forces the coupling plug 56 upwardly into firm engagement with the power take-off socket 54. When the coupling plug is firmly engaged within the take-off socket, the weight of the hand-held mixer unit 10 will preclude further expansion and unwinding of the coil spring, so that torque will be transmitted in a slip-free fashion to the stirrer shaft 34 through the coil spring 58. The inner surface 60 of the power take-off socket 54 is formed to tightly engage the outer surface of the coupling plug 56 when the hand-held mixer unit 10 is in place on the conversion unit 20.

The configuration of the conversion unit 20 is designed to provide an especially stable support for the hand-held mixer unit 10 when it is employed to power the mixing element 33. The superior stability of the appliance is achieved in part by forming a pair of opposed stabilizing fingers 62 in the bottom wall 32 of the power unit receptacle 26, each of which is approximately equidistant from the housing 40 and the coupling plug 56. As is clearly shown in FIGS. 2 and 3, fingers 62 extend upwardly from the bottom wall 32, and when the power unit of the hand-hand mixer unit 10 is positioned in the power unit receptacle 26 so that the power take-off socket 54 of the mixer receives the take-off coupling plug 56, the stabilizing fingers will engage complementary recesses 64 (only one of which is shown in FIG. 4) in the rear wall 18 of the mixer housing. This arrangement both effectively counters the torque effects produced by driving the coupling plug 56 during operation and assists in guiding the coupling plug into place within the power take-off socket 54.

Additional stability is provided to the converted hand-held mixer 10 by utilizing the beater ejector structure 66 associated with the beater sockets 67 (shown in FIG. 5) which holds or ejects the pair of beaters 19, as required, when the mixer unit 10 is used in its portable, unconverted state. The beater ejector structure projects outwardly from the underside 14 of the mixer unit and includes a lever 69 which is depressed to release the beaters. A bracket 71 is provided at the rear of the power unit receptacle, as shown in FIGS. 3 and 5, to matingly engage the lever and latch it within the power unit receptacle. If a different configuration of beater ejector mechanism is employed, a hook or similar structure may be provided to engage the bracket 71.

Because of the superior stability imparted to the appliance by the interaction of the conversion unit projections 62 and mixer unit sockets 64 and the beater ejector mechanism engaging lever 69, additional holding and stabilizing structure is not required on the conversion unit 20 to hold the mixer unit 10 in place. Consequently, the conversion unit power unit receptacle 26 can be configured to conform to the configuration of the mixer unit 10 so that the appliance presents the streamlined, aesthetically pleasing appearance shown in FIG. 6. Flanges 68 may therefore be provided on the front of the power unit receptacle 26 for the purpose of conforming the front of the receptacle to the side contours of the mixer unit to create a unified impression. As a result, the present appliance resembles a unitary drink mixer rather than merely a converted hand mixer.

FIG. 5 also illustrates an additional feature of the present invention which further enhances its efficiency and streamlined appearance. The standard 24 is open at the rear to form a storage recess 70 within which a horizontal storage rack 72 is situated to hold the pair of mixer beaters 19. The storage rack 72 may include a pair of notches 74 as shown or other structure suitable for removably engaging the beaters within the storage recess 70 so that they are concealed by standard 24 when the appliance is viewed from the side, as in FIG. 1. It is, therefore, possible to maintain all the detachable components of the present invention within a single streamlined unit without detracting from the overall appearance of the unit so that the unit complements the decor of the domestic kitchen in which it is most likely to be used.

Conversion of the appliance from a hand-held portable mixer to a stationary drink mixer is quickly and easily achieved, as illustrated in FIG. 1. The portable hand held mixer unit 10 is shown at the right side of FIG. 1 with the beaters 19 secured in place for use with a mixing bowl 76 or similar container. The mixer unit is oriented so that the longest longitudinal dimension of housing 12 is substantially horizontal with respect to the work surface. To convert the mixer from this orientation to its position in the conversion unit at the left side of FIG. 1, where the longest longitudinal dimension of the mixer unit housing is substantially vertical with respect to the work surface, requires that the beaters 19 be ejected by the beater ejector mechanism and the mixer unit 10 be moved through the phantom line illustrated path into the power unit receptacle 26 with the handle 13 projecting outwardly between flanges 68. During this downward insertion of the mixer unit 10 into the receptacle 26, the sockets 64 in the rear wall 18 of the mixer unit will engage fingers 62 on the conversion unit, and guide the power take-off socket into engagement with the coupling plug 56, while the latch 69 of the beater ejector mechanism engages the bracket 71. The appliance in this orientation is immediately ready to be used as a stationary drink mixer. Conversion from a drink mixer to a portable hand-held mixer is accomplished by reversing the process just described.

As previously indicated, the portable hand-held mixer 10 may be replaced by another hand-held electric appliance which is provided with an electric motor having the power take-off socket 54 of FIG. 4. Although the conversion unit 20 is particularly adapted for use with a portable hand-held mixer, it may be used with other appliances or even with a portable electric motor having a power take-off socket 54 which is used to drive a number of different appliances.

INDUSTRIAL APPLICABILITY

The versatile, multi-function appliance of the present invention will find its primary application in the home kitchen where a space-saving streamlined appliance is desired which may be quickly and easily converted from a portable hand-held appliance, such as a mixer, capable of being used in a variety of locations about the kitchen, to a stationary drink mixer employed at a single location to mix a milkshake and which may be reconverted from a stationary drink mixer to a portable hand-held appliance with equal facility.

From the foregoing, it should be apparent that the present invention, as reflected by the above-described preferred embodiment, is able to achieve all of the objects sought to be achieved and others that will be readily apparent to those of ordinary skill in the art. Moreover, while only a single embodiment has been described in accordance with the present invention, it should be understood that the same is not limited thereto, but is susceptible of numerous changes and modification as known to those skilled in the art and therefore the present invention should not be viewed as limited to the details shown and described herein, but also covers all such changes and modifications that are encompassed by the scope of the appended claims.

We claim:

1. A conversion unit for converting a portable hand-held appliance of the type having a power unit with a housing enclosing a motor which is drivingly coupled to a power take-off means to a stationary drink mixer, said conversion unit comprising:
    a. a base with an upright standard extending upward from said base;
    b. power unit receiving means on the uppermost end of said standard for detachably and fixedly holding the appliance power unit;
    c. elongated stirring means for mixing substantially liquid compositions rotatably journaled to said power unit receiving means to extend toward said base; and
    d. coupling means connected to said stirring means and extending into said power unit receiving means for matingly engaging the appliance power unit power take-off means upon reception of the power unit within the power unit receiving means to provide a driving connection between said power unit and said stirring means.

2. A conversion unit as described in claim 1, wherein said conversion unit includes coupling adjustment means positioned between said stirring means and said coupling means for positionally adjusting said coupling means to create a slip-free torque transmission when said coupling means is driven by the power take-off means.

3. A conversion unit as described in claim 2, wherein the coupling adjustment means comprises a coil-spring wound in a direction opposite to the direction in which the stirring means is driven, in use, by the power take-off means.

4. A conversion unit as described in claim 1, wherein said power unit receiving means includes a bottom wall, and stirring means is rotatably journaled to the bottom wall.

5. A conversion unit as described in claim 4, wherein said bottom wall of said power unit receiving means includes a pair of opposed stabilizing means for engagement in complementarily shaped recesses in the housing of the power unit to counter torque effect produced during operation, said stabilizing means projecting from said bottom wall on either side of said stirring means.

6. A conversion unit as described in claim 1, wherein said standard is rearwardly open to form a storage space, a rack means for holding appliance components being located in said storage space.

7. A convertible mixer combination comprising a portable hand-held mixer of the type having a power unit with a housing enclosing a motor that is drivingly coupled to a pair of beater sockets and to a supplemental power take-off socket and a conversion unit for converting the portable hand-held mixer into a stationary drink mixer, said conversion unit including:
    a base with an upright standard;
    a power unit receptacle located at an upper end of said standard and having a receiving space for detachably fixedly holding the mixer power unit;
    a stirrer having a vertical shaft that is rotatably journaled to a bottom wall of said power unit receptacle; and
    a take-off coupling plug connected to an upper end of the stirrer shaft, said take-off coupling plug projecting upwardly into said receiving space at a location for matingly engaging the supplemental power take-off of the mixer power unit upon reception of the power unit within said receiving space.

8. A conversion unit according to claim 7, further including coupling adjustment means, connected between the stirrer shaft and the take-off coupling plug, for positionally adjusting the take-off coupling plug to create a slip free torque transmission when said take-off coupling plug is driven by the supplemental power take-off.

9. A conversion unit according to claim 7, wherein the coupling adjustment means is a coil-spring wound in a direction opposite to the direction in which the stirrer shaft is driven, in use, by the supplemental power take-off.

10. A conversion unit according to claim 7, wherein the power unit receptacle is open at top and front sides, and is at least partially closed by wall members at a rear side and lateral sides, said wall members being positioned for holding the power unit in a vertically oriented position supported upon the bottom wall of the receptacle.

11. A conversion unit according to claim 7, wherein a stabilizing finger projects from said bottom wall into the receiving space on both lateral sides of the take-off coupling plug for engagement in complementarily shaped recesses in the housing of the power unit so as to counter torque effect produced during operation.

12. A conversion unit according to claim 7, wherein the standard is rearwardly open to form a storage space, a rack for holding a pair of beaters for the mixer being located in said storage space.

* * * * *